Patented July 20, 1948

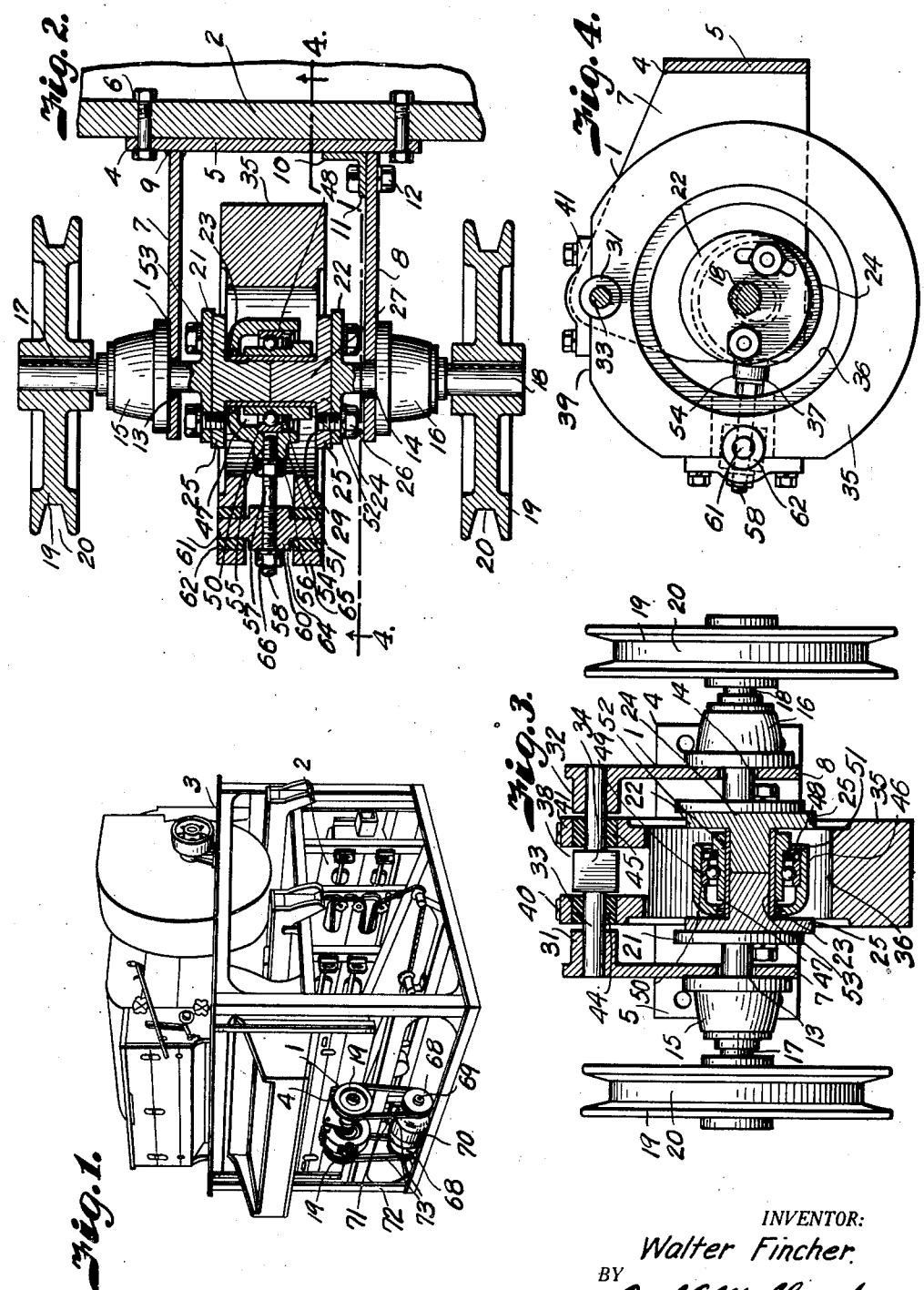

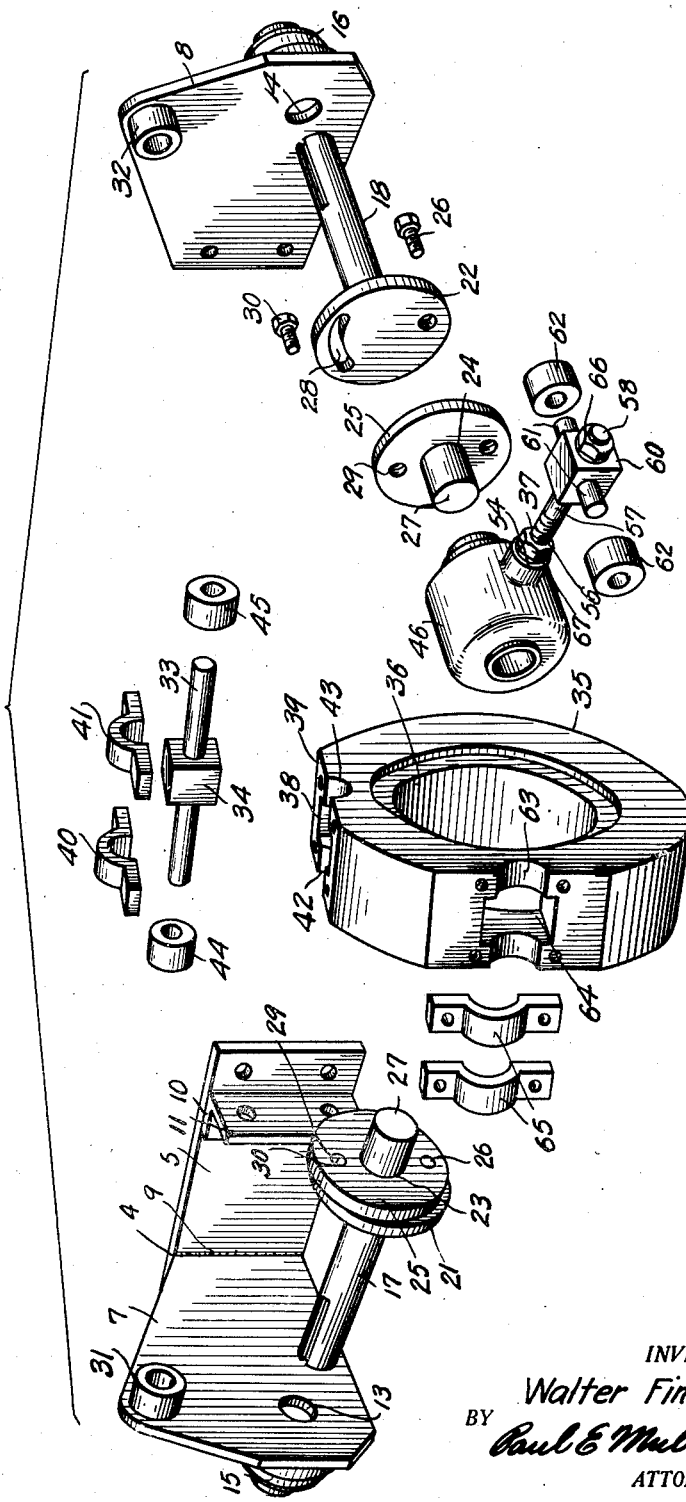

2,445,613

UNITED STATES PATENT OFFICE 2,445,613

DRIVE MECHANISM FOR RECIPROCATING DEVICES

Walter Fincher, Salina, Kans.

Application November 22, 1943, Serial No. 511,264

11 Claims. (Cl. 74—26)

This invention relates to vibrators for operating a reciprocatory element such as the screen of a separator, sifter, grater, or similar machine wherein it is necessary to impart a rapid vibratory movement to a part thereof.

Machines of this character usually produce considerable vibration which is destructive to the bearings and other working parts of the machine. Furthermore, when a number of these machines are installed, as in a flour mill, the machines become synchronized and the vibration is destructive to the building in which the machines are housed. Therefore, it is a principal purpose of the present invention to provide a vibratory mechanism wherein the destructive and objectionable vibrations are eliminated by balancing the vibratory thrusts of the actuating mechanism.

Other objects of the invention are to provide a simple, free-acting vibratory mechanism; to provide a mechanism that is silent in operation; to provide a mechanism that produces a uniform screening action; and to provide a mechanism that may be directly mounted upon the element to be actuated or connected therewith through a conventional connecting rod.

In accomplishing these and other objectives of the invention, I have provided improved structure, the preferred form of which is illustrated in the accompanying drawings wherein:

Fig. 1 is a perspective view of a cleaner equipped with a screen shoe actuated by a vibrating mechanism constructed in accordance with the present invention, the vibratory mechanism being mounted directly upon the screen shoe.

Fig. 2 is a horizontal section through the vibrating mechanism.

Fig. 3 is a vertical section through the vibrating mechanism.

Fig. 4 is a cross section on the line 4—4 of Fig. 3.

Fig. 5 is a perspective view of the parts of the vibratory mechanism shown in disassembled spaced relation.

Referring more in detail to the drawings:

1 designates an actuator mechanism for imparting vibratory or oscillatory movement to a reciprocating element which may be the screen shoe 2 of cleaner 3 as illustrated in Fig. 1.

The mechanism 1 includes a bracket 4 having a base plate 5 adapted for attachment to the shoe 2 by fastening devices such as bolts 6. Projecting laterally from the plate 5 are plate-like arms 7 and 8. The arm 7 is rigidly attached to the base plate 5 by welding 9, while the plate 8 is removably connected with the base plate to facilitate assembly of the mechanism later described.

To facilitate removal of the arm 8, the base plate is provided with angle 10 having a flange 11 cooperating with the base plate to seat the arm 8 and for attachment by fastening devices such as bolts 12 projecting through openings in the flange 11 and registering openings in the arm 8.

Formed in the outer ends of the arms are openings 13 and 14 and fastened to the outer side of the respective arms in aligning registry with the openings are bearing housings 15 and 16, preferably mounting anti-friction bearings (not shown), for shafts 17 and 18, carrying driving means on the outer ends thereof, which in the illustrated instance, are pulleys 19 having grooved peripheries 20. The inner ends of the shafts project through the openings in the plate-like arms 7 and 8 and carry flange-like heads 21 and 22. Adjustably supported on the facing sides of the heads are eccentrics 23 and 24. Each eccentric includes a disk-like plate 25 substantially conforming in diameter to the heads 21 and 22 and are pivotally supported thereon by fastening devices such as cap screws 26 located eccentrically of the axis of shaft rotation to adjust the disks for locating eccentric pins 27 thereon eccentrically with the respect to the axis of the shafts so as to impart a desired degree of pin gyration for imparting a required reciprocatory movement to the screen shoe as later described.

In order to secure the eccentrics in a selected position, the heads are provided with arcuate slots 28 on sides thereof opposite the pivot members 26 and extending through the slots and into threaded openings 29 in the eccentric disks are cap screws 30. It is thus obvious that the axis of the pins 27 may be moved within the range of the slots a selected distance of center.

The plate-like arms 7 and 8 are provided with bearings 31 and 32 located above the shaft bearings 15 and 16 but projecting from the inner faces of the arms as best shown in Fig. 5. Oscillatively mounted in the bearings 31 are the ends of a shaft 33 extending parallel with the eccentric pins. Formed on the shaft 33 intermediate the ends thereof, is a spacer 34 adapted to cooperate with the bearings 31 and 32 to suspendingly position a pendulum weight 35. The pendulum weight 35 is of ring-shape formation and has an inner bore 36 substantially coaxial with the shafts 17 and 18 and is of ample diameter to accommodate the eccentrics therein and to permit operation of an eccentric rod 37 later described.

The upper face of the weight is provided with a recess 38 to accommodate the spacer 34 therein and the face surrounding the recess is provided with a flattened area 39 for mounting bearing caps 40 and 41 which cooperate with half bearings 42 and 43 in the weight for attachment to the shaft 33 as best shown in Fig. 5.

In order to absorb vibratory shocks incidental to oscillation of the weight on the shaft 33, the bearings are provided with resilient bushings 44 and 45 formed of rubber or the like.

The eccentric rod 37 previously mentioned includes a cup-like head 46 having a recess 47 in one side thereof to accommodate an anti-friction bearing 48, the outer race 49 of which is retained against an annular internal shoulder 50 by a ring 51 pressed into the recess, as best shown in Fig. 2. The inner race 52 of the bearing is mounted on a bushing 53 which has its ends sleeved over the eccentric pins to couple the eccentric pins in axial alignment, as shown in Fig. 2.

Extending from one side of the eccentric head is a boss 54 having an internally threaded bore 55 for mounting the threaded end 56 of a rod 57 having the other end 58 threaded into a bore 59 of a block 60. The block 60 has trunnions 61 projecting laterally from opposite sides thereof and journaled in resilient bushings 62 that are carried by the pendulum weight 35 at a point substantially 90 degrees from the shaft 33 and in substantially the plane of the vibratory thrusts to be imparted.

The bushings 62 are retained in recesses 63 that are located on opposite sides of an opening 64 in the weight by means of caps 65; the opening 64 being of a size to freely accommodate the block 60 so that it may oscillate therein incidental to actuation of the eccentrics and impart vibratory thrusts to the weight. The rod is retained in adjusted position by jamb nut 66 and 67 threaded on the rod and respectively engaging against the block 60 and the boss 54 of the eccentric head as best shown in Fig. 2, lock washers preferably being inserted under the jamb nuts.

The apparatus just described may be mounted directly upon the screen shoe 2 as illustrated with the pulleys 19 aligning with driving pulleys 68 that are fixed upon the respective ends of an armature shaft 69 of a motor 70, the motor 70 having a fixed mounting on a suitable bracket 71 carried by the stationary framework 72 of the machine on which the mechanism is mounted. Operating over the driving and driven pulleys are endless belts 73 for effecting rotation of the shafts 18 and 19.

In operating the mechanism constructed and installed as described, rotation of the shafts 17 and 18 product a gyratory movement of the eccentric pins to cause actuation of the eccentric rod for imparting vibratory thrusts to the pendulum weight, which weight is free to move under such thrusts. However, the weight thereof is so proportioned with respect to the weight of the screen shoe that the effective thrusts acting on the weight are effective in causing counter-movement of the screen shoe in the opposite direction to the imparted thrusts. In other words, the force of the thrusts are expended between moving the weight and the screen shoe, and since the screen shoe is the lighter to move, the section produced by the thrusts cause movement of the shoe reversely to movement of the pendulum weight.

The effect of the weight upon movement of the shoe may be adjusted through changing the effective length of the eccentric rod. The extent of the thrusts of the eccentric may be adjusted by loosening the cap screws 26 and 30 and shifting the eccentrics so that the axis of the eccentric pins are moved to a desired off-center relation with the rest of axis of rotation to the shaft 17 and 18, after which the cap screws are retightened to retain the assembly.

Another suggested mounting for the operating mechanism would be to suspend the entire mechanism by the belts 73 and to connect the supporting bracket 2 with the element to be actuated by means of a suitable connecting rod not shown. This structure would be particularly adapted to various types of equipment where the screen element to be actuated is completely housed within a casing such as in the instance of a middlings separator.

From the foregoing, it is obvious that I have provided a vibratory mechanism that is of simple and inexpensive construction and is so designed that the operating mechanism thereof dampens the counter-vibrations which are destructive to the bearings of the machine and to the supports on which the machine is mounted.

What I claim and desire to secure by Letters Patent is:

1. A device of the character described including a bracket having spaced arms, shaft bearings carried by the arms in registering alignment with each other, shafts in said bearings, eccentrics on said shafts, a ring-shaped weight positioned circumferentially of the eccentrics, means oscillatably supporting the weight from said arms, means connecting the eccentrics with said weight, and driving means on the respective shafts for actuating the eccentrics to effect oscillation of said weight.

2. A device of the character described including a bracket having spaced arms, shaft bearings carried by the arms in registering alignment with each other, shafts journaled in said bearings, disk-shaped heads on the shafts, pins having eccentric mountings on said heads, an eccentric rod having connection with said pins, a ring-shaped weight positioned circumferentially of the disk-shaped heads, means oscillatably supporting said weight from said arms, means connecting the eccentric rod with said weight, and driving means on the respective shafts for actuating the eccentric rod to effect oscillation of said weight.

3. A device of the character described including a bracket having spaced arms, shaft bearings carried by the arms in registering alignment, shafts journaled in said bearings, pins carried on said shafts eccentrically of the rotational axis of said shafts, a bushing coupling the pins, a rod connected with the bushing, a ring-shaped weight positioned circumferentially of the disk-shaped heads, means oscillatably supporting the weight from said arms, means connecting the eccentric rod with said weight, and driving means on the respective shafts.

4. A device of the character described including a bracket having spaced arms, shaft bearings carried by said arms in alignment with each other, shafts journaled in said bearings, disk-shaped heads on the shafts, disks having adjustable eccentric support on the heads, pins on said disks, a sleeve coupling the pins, a ring-shaped weight positioned circumferentially of the disk-shaped heads, an eccentric rod connecting the sleeve with the weight, means oscillatably supporting the weight from said arms, and driving means for said shafts.

5. A device of the character described including a bracket having spaced arms, shaft bearings carried by said arms in alignment with each other, shafts journaled in said bearings, disk-shaped heads on the shafts having arcuate slots, eccentric disks, means pivotally supporting the eccentrics on the hooks at points substantially opposite said slots, means carried by the heads and extending through said slots to fasten the disks in a fixed position relatively to said heads, pins on said disks, a bushing sleeve coupling the pins, a ring-shaped weight positioned circumferentially of said heads, an eccentric rod connecting the bushing sleeve with the weight, means oscillatably supporting the weight from said arms, and driving means for said shafts.

6. An apparatus of the character described including a bracket, an eccentric, means rotatably mounting the eccentric on the bracket, a substantially ring-shaped weight, means pivotally suspending the ring-shaped weight from a side thereof on the bracket with the axis of said ring-shaped weight substantially coaxial with the eccentric, means connecting the eccentric with the weight to effect oscillation of the weight in synchronism with the eccentric, and means supporting the bracket for movement with a device to be reciprocated.

7. A driving mechanism including a support, a shaft, an eccentric mounting head on the shaft, an eccentric, means for adjustably mounting the eccentric on said head, a weight, means for pivotally supporting the weight on the support, means connecting the eccentric with the weight, and means connecting the support with a device to be reciprocated.

8. In combination with a reciprocatory device, an actuating mechanism for said device, including a supporting member, a pendulum weight, means pivotally connecting the pendulum weight with the supporting member, an eccentric carried by the supporting member for reciprocation with the reciprocatory device and having an oscillating connection with the pendulum weight, and an eccentric actuating mechanism connected with the eccentric.

9. A device of the character described including an oscillatory support, a shaft rotatable on the support, an eccentric on the shaft, a substantially ring-shaped pendulum weight, means pivotally mounting one side of said pendulum weight for oscillatory movement on the support with the axis of said ring adapted to swing through an extended axis of said shaft, and means connecting the eccentric with the pendulum weight to effect said oscillation.

10. A device of the character described including a support, spaced coaxial bearings on the support, a shaft journalled in each bearing, heads on the shafts, eccentrics, means for adjustably mounting the eccentrics on said heads, a weight, means for supporting the weight for oscillatory movement, bearing means intercoupling the eccentrics, a connector connecting said bearing means with the weight, and driving means for said shafts.

11. A device of the character described including a supporting member, shaft bearings carried by the supporting member in spaced coaxial alignment, a shaft journalled in each bearing, a disk-shaped head on each shaft, pins having eccentric mountings on said heads, means intercoupling said pins for gyratory movement with said pins about the axes of said shafts, a ring-shaped weight positioned circumferentially of the disk-shaped heads, means oscillatably supporting said weight from the supporting member, means connecting the coupling means with said weight, and driving means on the respective shafts for effecting oscillation of said weight.

WALTER FINCHER.

REFERENCES CITED

The following references are of record in the file of this patent:

UNITED STATES PATENTS

| Number | Name | Date |
|---|---|---|
| 989,958 | Frahm | Apr. 18, 1911 |
| 1,267,886 | Malysheff | May 28, 1918 |
| 1,973,510 | Schieferstein | Sept. 11, 1934 |
| 2,137,591 | Sarazin | Nov. 22, 1938 |

FOREIGN PATENTS

| Number | Country | Date |
|---|---|---|
| 118,033 | Austria | June 10, 1930 |
| 203,319 | Great Britain | Aug. 14, 1924 |
| 765,723 | France | June 14, 1934 |